United States Patent Office 3,420,746
Patented Jan. 7, 1969

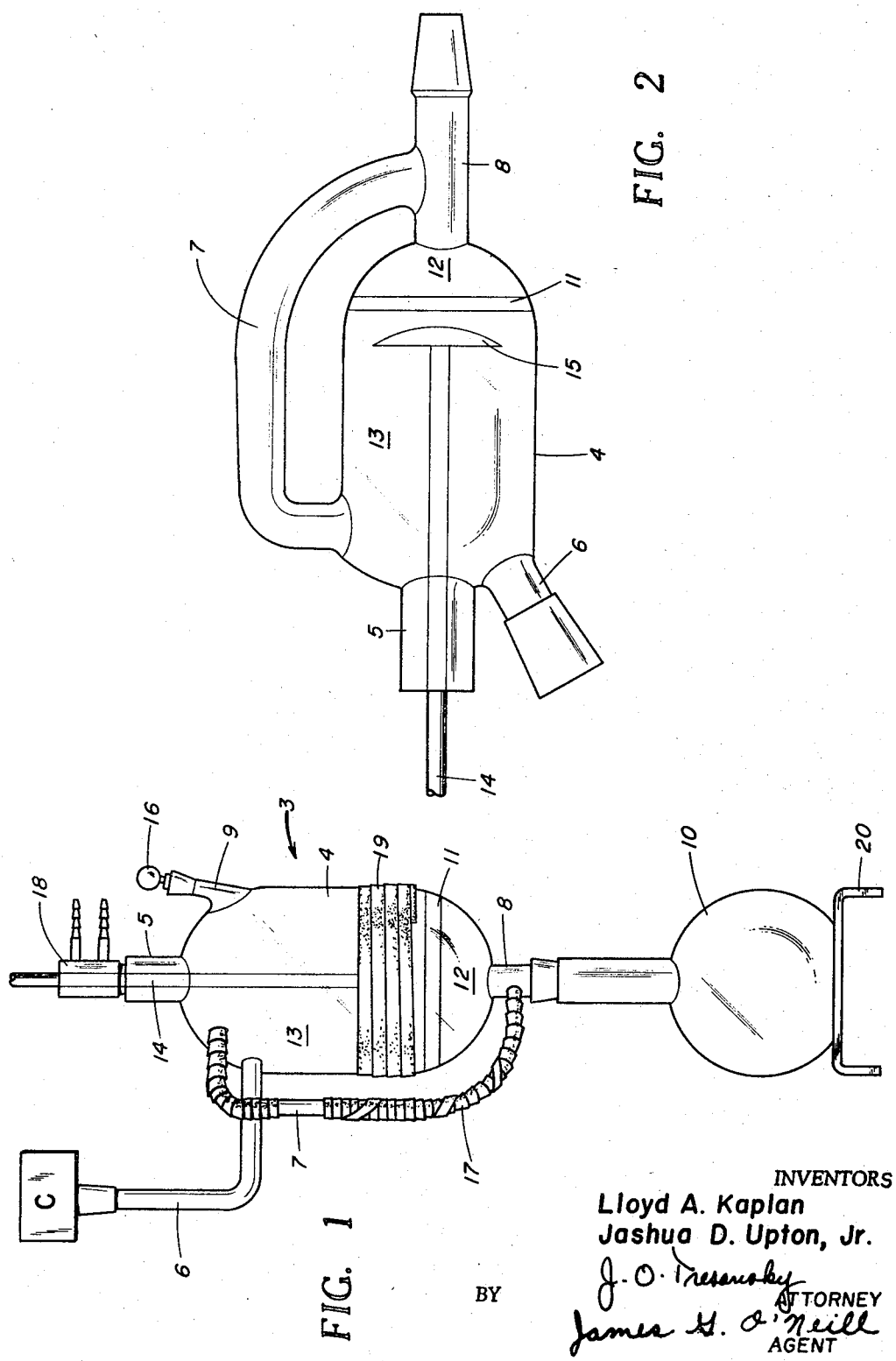

3,420,746
EXTRACTION-CRYSTALLIZATION APPARATUS
Lloyd A. Kaplan, Silver Spring, and Joshua D. Upton, Jr., Beltsville, Md., assignors to the United States of America as represented by the Secretary of the Navy
Filed Sept. 9, 1966, Ser. No. 579,184
U.S. Cl. 202—169      2 Claims
Int. Cl. B01d 3/40

ABSTRACT OF THE DISCLOSURE

An apparatus for recrystallizing and purifying compounds which have limited solubility in hot solvents wherein an extractor having a condenser and a stirrer is divided into two chambers by a sintered glass disc. A distillation flask is mounted below the extractor. The extractor and flask are in fluid flow relationship by the means of two tubes one connected above and one connected below the extractor disc. The material to be extracted is placed on the disc and solvent is distilled from the flask into the extractor and condensed on the disc. The solvent and the dissolved material flow through the disc into the distillation flask and this operation is continued until crystalline solid appears in the solvent in the flask.

---

The invention described herein may be manufactured and used by or for the Government of the United States of America for governmental purposes without the payment of any royalties thereon or therefor.

The present invention relates to the art of recrystallization and more particularly to a continuous method and apparatus for preparing high purity and bulk organic compounds such as explosives.

In the past, common laboratory extractors or distillation apparatus used for recrystallizing and purifying large quantities of organic compounds, in continuous extraction techniques, have had to handle large volumes of solvent. The organic compounds treated were relatively insoluble in the solvent, therefore making it necessary to use large quantities of solvent to completely solubilize the organic compound.

Considerable difficulty and wasted time was experienced in handling and storing the large volumes of solvent needed for the extraction process hereinbefore mentioned. Furthermore, conventional laboratory Soxhlet extractors were not sufficiently efficient to produce pure and clean products since they failed to uniformly disperse the organic material throughout the solvent. Although, in general, these Soxhlet extractors have performed satisfactorily, these devices have not been found to be entirely suitable in applications wherein compounds having a limited solubility in hot solvents were to be prepared.

Accordingly, an object of the present invention is the provision of a continuous extractor which provides efficiency and economy of operation.

A further object of this invention is the provision of a new method and apparatus for continuously recrystallizing and purifying organic compounds.

Another object of this invention is the provision of a new method and apparatus for preparing high purity and high bulk compounds which have limited solubility in hot solvents.

According to the present invention, the foregoing and other objects are attained by the provision of an extractor having a condenser connected thereto, with a stirrer extending into the extractor chamber which is divided into two sub-chambers by a sintered glass filter disc. A flask for holding solvent is mounted below the extractor. The extractor and flask are connected in fluid flow relationship by two tubes, one connected above and one connected below the sintered disc. The material to be extracted is placed on the sintered disc, the solvent brought to boil and distilled from the flask into the extractor via a closed circuit tube and condensed on the disc. The solvent and the dissolved material filter through the disc into the flask. This operation is continued by recycling the solvent until the desired amount of crystalline solid is collected in the solvent in the flask.

A more complete appreciation of the invention and many of the attendant advantages thereof will be readily apparent as the same becomes better understood by reference to the following detailed description of a preferred embodiment of the invention when considered in connection with the accompanying drawing in which:

FIG. 1 is an elevational view of the extraction set-up to accomplish the method of this invention; and FIG. 2 is a view of the extractor apparatus of this invention used in the set-up of FIG. 1.

Referring now to the figures of the drawing wherein like reference characters designate like or corresponding parts throughout the several views, there is shown a set-up to be used in the continuous extractive crystallization process of this invention. This set up includes an extractor 3, preferably made of glass, composed of a hollow cylindrical container 4 and having tubes 5, 6, 7, 8 and 9 integrally connected to openings formed in the container. A distillation unit or flask 10, for holding the solvent required to solubilize an organic compound is disposed beneath and connected to the extractor container 4 via tube 8. A condensor C is operatively connected with the interior of the extractor container 4 via tube 6. A filter 11 in the form of a sintered glass disc separates the interior of the extractor container into two sub-chambers 12 and 13. Closed circuit tube 7 provides fluid communication between upper chamber 13 and tube 8, while lower chamber 12 is connected to flask 10 by tube 8.

The extractor is provided with a rod 14 having a stirrer 15 on the end thereof sealingly extending through tube 5 into the upper chamber 13 and is used to stir the slurry formed by the organic material that is placed on the disc 11 and mixed with solvent that enters chamber 13. The tube 9 formed on the top of the container 4 may be used to add any additional organic material which may be needed, to the chamber 13. The tube 9 is normally sealed by a plug 16. As shown, a glass covered heating tape 17 is wrapped around tube 7 to prevent condensation of the solvent in the tube. a heating tape 19 is also wrapped around the extractor just above the filter disc 11, to heat the mixture of solvent and organic material contained in the chamber 13. A water cooled bearing 18 is provided for the stirrer rod 14.

Flask 10 rests on a stand 20 which may contain a heating pad or some other means to heat the solvent in the flask to boiling. Because of the relatively small amount of solvent used in this recycling process large savings in economy of size and time are realized. Smaller units to hold the solvent are utilized and provide a savings in labor and time in the handling thereof. Furthermore, because of the smaller amount of solvent needed in this invention, less time and energy is needed to heat the solvent to reflux.

In operation, a given amount of organic material to be purified and recrystallized is placed in the upper chamber 13 on the disc 11. A known amount of solvent is added to flask 10 and heated to reflux, i.e. the boiling point, and distilled into the extractor container 4 via tubes 8 and 7 to form a slurry with the organic material placed in chamber 13. The heating tape 17 wrapped around the tube 7 is activated to heat tube 7 thereby preventing condensation of the solvent vapor which passes from the flask to the upper chamber 13. The condensate or vapor enters the condensor C and returns to the chamber in liquid form. The heating tape 19 wrapped around the extractor container may also be activated so that the slurry formed in chamber 13 will be heated to a temperature where the solvent will dissolve more of the organic material per unit volume of solvent. When sufficient solvent has been distilled into chamber 13 to obtain a stirrable slurry, the organic material is uniformly dispersed throughout the solvent by operation of stirrer 15. The solvent is returned to the flask 10 by filtering through the sintered glass disc 11. The color of the solvent returning to the flask 10 serves to indicate whether the desired product and/or organic impurities are being removed by this process. The extraction process is continued by recycling the solvent through tube 7 until the desired amount of crystalline solid appears in the solvent in the flask 10. Heat is then removed from the solvent and the solvent allowed to cool; while any solvent remaining in the chamber 13 is allowed to drain into the flask 10. As the solvent cools an increase in the crystalline solid results and may be identified by its color. The crystalline product is then filtered from the solvent, by any conventional manner, washed thoroughly and dried. If further extraction is desired fresh solvent may be added to the flask and the above process repeated. During the reflux or boiling process as hereinbefore mentioned, additional solvents or solids may be added through the tube 9 or condensor C.

Although the apparatus has been described as formed of glass it will be readily apparent to those skilled in the art that larger equipment to accomplish the same purpose, at much higher rates, can be made of stainless steel or other non-corroding materials without affecting the utility thereof.

Obviously many modifications and variations of the present invention are possible in the light of the above teachings. It is therefore to be understood, that within the scope of the appended claims, the invention may be practised otherwise than as specifically described.

What is claimed is:

1. An extractor apparatus comprising a container, a filter dividing said container into an upper and lower chamber:
   a closed circuit tube operatively interconnecting said upper and lower chambers in fluid flow relationship,
   heating tape wrapped around said closed circuit tube,
   a stirrer disposed within said upper chamber,
   a distillation unit mounted below said container,
   a tube operatively interconnecting said distillation unit and said lower chamber, and
   a condenser operatively connected to said container.

2. Extractor apparatus according to claim 1 and further including a heating tape wrapped around said container above said filter.

References Cited

UNITED STATES PATENTS

| | | | |
|---|---|---|---|
| 2,136,372 | 11/1938 | Burnett | 23—270 |
| 2,746,846 | 5/1956 | Grunewald et al. | 23—270.5 X |
| 2,862,548 | 12/1958 | Yost | 159—25 |
| 3,142,589 | 7/1964 | Schaffer et al. | 23—270 X |

REUBEN EPSTEIN, *Primary Examiner.*

U.S. Cl. X.R.

23—272.6